Figure 1:
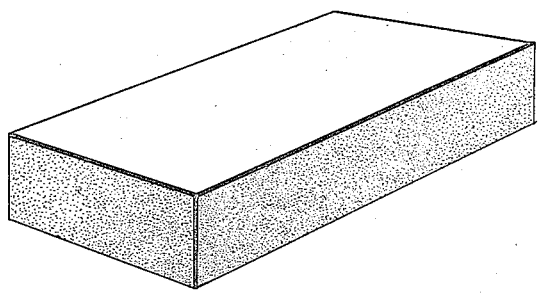

H. R. WARDELL.
TILE OR PAVING BLOCK.
APPLICATION FILED DEC. 23, 1915. RENEWED AUG. 16, 1918.

1,281,444.

Patented Oct. 15, 1918.

Inventor
Henry R. Wardell
By his Attorney

UNITED STATES PATENT OFFICE.

HENRY R. WARDELL, OF NEW YORK, N. Y., ASSIGNOR TO H. W. JOHNS-MANVILLE COMPANY, A CORPORATION OF NEW YORK.

TILE OR PAVING-BLOCK.

1,281,444.　　　　Specification of Letters Patent.　　Patented Oct. 15, 1918.

Application filed December 23, 1915, Serial No. 68,449. Renewed August 16, 1918. Serial No. 250,233.

*To all whom it may concern:*

Be it known that I, HENRY R. WARDELL, a citizen of the United States of America, residing at New York city, borough of Manhattan, county and State of New York, have invented certain new and useful Improvements in Tile or Paving-Blocks, of which the following is a specification.

While my invention relates generally to tiles or blocks used for paving and similar purposes, it is particularly useful in cases where the paving of floors, or linings of walls must not only be of a material which is hard and durable, but must also be a fairly good non-conductor of heat and impervious to moisture.

My invention is particularly useful as a pavement for stalls or stables in which animals of highly bred and delicate stock are kept. The ordinary flooring of cement or brick, is absorbent of moisture and filth and a good conductor of heat. Hence it is unsanitary and forms cold, slimy, uncomfortable surfaces for cattle to rest upon. Glazed tile, is of course, non-absorbent of moisture, but is a very good conductor of heat. As a result high priced dairy cows often contract diseases of the udder from lying on such floors, and even if the effect of the cold surfaces is not so serious as to produce disease, the resulting discomfort interferes with the full production of milk and cream by the animal. My invention overcomes this difficulty by producing a floor surfacing or paving which is as non-conducting of heat as a spruce flooring of the same thickness, has nearly as much elasticity as such spruce flooring would possess, is as impervious to moisture as glazed tiles, and affords as sure a footing for the animals as would a wooden floor.

To this end my invention consists in a tile or paving block composed of granulated cork, finely divided mineral matter, such as limestone dust and sand, and a water resistant cementing material such as asphalt.

The best method of producing these blocks or tiles at present known to me is to first mix in a suitably heated kettle the above noted materials in about the following proportions by weight, granulated cork 60 per cent., beach sand 20 per cent., limestone dust 10 per cent., asphalt 10 per cent., and stir thoroughly until the asphalt is fully liquefied and the ingredients are thoroughly intermixed so that the fine particles of limestone dust will arrange themselves between the larger particles of sand, filling the voids that would otherwise exist between said sand particles, the sand and limestone mixture will be disseminated evenly between the much larger particles of granulated cork, filling the voids which would otherwise exist between these, and the liquid asphalt will permeate the mass forming films of a cementing medium between all adjacent surfaces of the above recited constituent particles. The hot and plastic mass is then poured into molds of a length and breadth equal to the length and breadth of the tiles or blocks to be produced, but of a depth equal to about double the thickness desired in the completed tile. Each molded mass is then subjected, preferably while still in the mold, to intense pressure in the direction of its thickness, with the result that the elastic cork particles are compressed into less space, and the mineral particles are intimately compacted together until they fill solidly all spaces between the cork particles and the resultant compacted mass has about half the thickness and double the density of the original molded mass. The material is left in the mold under this pressure until it cools. It can then be taken out, and will retain its form, the compressed cork particles being restrained from expansion by the binding action of the cold, hard asphalt which has become a firm matrix in which all the particles of cork and mineral matter are embedded.

Figure 2:
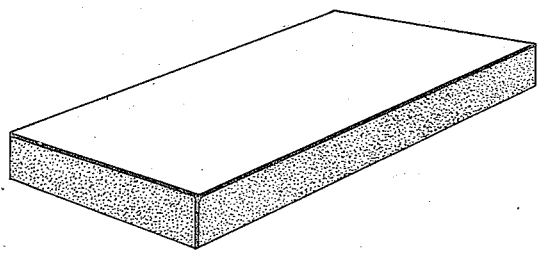

In the accompanying sheet of drawings, Figure 1 is a perspective view of the molded mass having a thickness usually of about four inches as it lies in the mold before compression, while Fig. 2 is a similar view of the completed tile or block which has been reduced to a thickness of about two inches by great pressure. In both figures of drawing the relative arrangement of constituent particles is indicated on the edges of the block in an exaggerated manner.

The tile or block so produced forms a most satisfactory pavement as it is slightly elastic, not slippery, absolutely waterproof, and a non-conductor of heat. It fails only in positions where it is subjected to heat.

Other materials of a mineral character can be substituted in some cases for the sand and limestone mentioned above, and the proportions may be varied within limits. Where greater hardness is desired the proportion of cork may be greatly reduced, and that of the mineral particles increased. This will usually require also an increase in the proportion of asphalt. In cases where less hardness is required the compacting of the block need not be carried to the full extent hereinbefore set out, and less pressure can be used in the manufacturing process.

Having described my invention, I claim:

1. As an article of manufacture a tile or paving block composed of a dense compacted mass of granulated cork, finely divided mineral matter, and asphalt, the mineral matter comprising approximately thirty per cent. and the asphalt approximately ten per cent. by weight of the mass in which the mineral particles fill substantially all of the voids which would otherwise be left between the cork particles and cementing asphalt films intervene between all adjacent surfaces of the constituent particles.

2. As an article of manufacture a tile or paving block composed of a dense, compacted mass of granulated cork, sand, limestone dust and asphalt, in which the limestone dust fills the voids between the larger particles of sand, and the limestone dust and sand fill the voids between the larger particles of granulated cork, while films of asphalt exist as a cementing medium between all adjacent surfaces of the above recited constituent particles.

3. As an article of manufacture a tile or paving block consisting of a dense, compacted mass composed of approximately sixty per cent. of granulated cork, twenty per cent. of sand, ten per cent. of limestone dust and ten per cent. of hard asphalt, in weight, in which the limestone dust fills the voids between the larger particles of sand, and the limestone dust and sand fill the voids between the larger particles of granulated cork, while films of asphalt exist as a cementing medium between all adjacent surfaces of the above recited constituent particles.

HENRY R. WARDELL.

Witnesses:
CHARLES E. HORTON,
A. J. ARIEL.